United States Patent [19]

Bernier

[11] 4,366,853

[45] Jan. 4, 1983

[54] PROCESS AND DEVICES FOR CAUSING A HEAT CARRIER FLUID TO CIRCULATE IN A CLOSED CIRCUIT COMPRISING A HOT SOURCE AND A COLD SOURCE

[76] Inventor: Jean Paul Bernier, Rte. de la Sainte Baume-Quartier de Vede, 13390 Auriol, France

[21] Appl. No.: 254,788

[22] Filed: Apr. 16, 1981

[30] Foreign Application Priority Data

Apr. 18, 1980 [FR] France .............................. 80 08847

[51] Int. Cl.³ ............................................. F28D 15/00
[52] U.S. Cl. .................................. 165/1; 165/104.22;
237/59; 417/207; 126/433
[58] Field of Search ................ 165/104.22, 1; 62/333;
237/59, 60, 63; 417/207, 208; 126/433

[56] References Cited

U.S. PATENT DOCUMENTS

| 209,742 | 11/1878 | Willoughby | 237/60 |
| 1,148,857 | 8/1915 | Reck | 237/62 |
| 1,658,412 | 2/1928 | Parker | 237/60 |
| 2,366,955 | 1/1945 | Burggrabe | 62/333 X |

*Primary Examiner*—Albert W. Davis, Jr.

[57] ABSTRACT

The present invention relates to a heat pump for the circulation of a heat carrier fluid in a closed circuit in order to transfer calories from a hot source towards a cold source. This pump comprises two closed tanks which communicate, one with the hot source, and the other with the cold source, a pipe which connects the upper parts of the two tanks and which is equipped with an automatic valve controlled by two level sensors sensing the high and low level of the liquid in one of the two tanks and a circuit which connects the lower part of the first tank to the second tank through the cold source.

11 Claims, 5 Drawing Figures

PROCESS AND DEVICES FOR CAUSING A HEAT CARRIER FLUID TO CIRCULATE IN A CLOSED CIRCUIT COMPRISING A HOT SOURCE AND A COLD SOURCE

The present invention relates to a process and devices of the heat pump type for circulating a heat carrier fluid between a hot source and a cold source, which are remote from each other and connected by a closed circuit of constant volume, in order to ensure heat exchange between the hot source and the cold source.

Contrarily to known thermodynamic machines, a heat pump according to the invention furnishes no energy to the outside and therefore has a zero yield. Consequently, in application of Carnot's principle, a heat pump according to the invention may cause a heat carrier fluid to circulate between a hot source and a cold source of which the temperature difference is small.

Heat pumps or thermocompressors are known, for example those which are described in the following Patents: FR 1 464 982 (Conduction Corporation), U.S. Pat. Nos. 4,036,019, 4,135,366, 4,180,982 and FR 75 13297 (I. Siegel), U.S. Pat. Nos. 3,407,626 (R. Turnblade), 3,648,458 (R. McAlister), 3,053,198 (H. Staehle), 2,688,923 (F. Bonaventura), DE 2,617,025 (Dornier).

In these known thermodynamic machines, every effort is made to minimise the heat exchanges between the hot source and the fluid to be pumped or compressed so as to conserve a considerable temperature difference between the hot source and the cold source in order to obtain a good yield.

On the contrary, in the devices according to the invention, the liquid phase of the heat carrier fluid having passed through the hot source is circulated in order to convey the maximum of calories from the hot source towards the cold source and to reduce the temperature difference between these two sources. Thus, for a reduced rate of flow of heat carrier liquid, a maximum heat exchange is obtained between the two sources.

It is an object of the present invention to cause a heat carrier fluid to circulate in closed circuit between a hot source and a cold source in order to exchange calories between the two sources, using self-contained means, independent of any source of energy other than that which is due to the difference in temperature between the two sources, even if the temperature difference between the two sources is relatively small, and if the two sources are remote from each other.

This purpose is attained by means of a process for causing a heat carrier fluid to circulate in a closed circuit of constant volume comprising a hot source, a cold source, a first closed tank, located at a level higher than that of the hot source, of which the lower part communicates with the top part of the hot source and a second closed tank which is located at a level at least equal to that of said first tank, which tanks contain a mixture of the liquid and vapour phases of said fluid, the top parts of said tanks being connected together by a pipe provided with a valve and the lower part of the first tank being connected to the second tank by a circuit passing through said cold source, said process comprising the following steps:

when the level of the liquid in the first tank reaches a high level, said valve is closed, the liquid of the first tank is heated by the hot source, the pressure increases in the first tank and the hot liquid is driven towards the second tank through the cold source and mechanical energy is accumulated, when the level of the liquid in the first tank reaches a low level, said valve is opened, the pressures in the two tanks become level and the liquid flows from the second tank towards the first under the effect of the accumulated mechanical energy;

and when the level of the liquid in the first tank again reaches a high level, a new cycle recommences and, in the course of these cycles, the heat carrier fluid circulates, conveying calories from the hot source towards the cold source without furnishing energy to the outside, so that the process may ensure an exchange of heat between two sources, even remote ones, having a small temperature difference between them.

A device according to the invention for causing a heat-carrier fluid to circulate in a closed circuit of constant volume comprising at least one hot source and at least one cold source, comprises:

a first closed tank, which is located at a level higher than that of the hot source and of which the lower part communicates with the top part of the hot source, a second tank which is located at a level at least equal to that of the first tank, which tanks contain a mixture of the liquid and vapour phases of said fluid, a pipe which connects the upper parts of said tanks containing the vapour phase and which is equipped with an automatic valve, two sensors for sensing the high and low level of the liquid-vapour interface in one of the two tanks, which control said valve, and a circuit which connects the lower part of the first tank to the second tank through said cold source.

The invention results in new self-contained heat pumps enabling a heat carrier fluid to be circulated in a closed circuit of constant volume, therefore without furnishing any energy to the outside. A pump according to the invention enables calories to be exchanged between a hot source and a cold source, using only the energy due to the differences in temperature of the two sources. During the first phase of each cycle, the heat carrier liquid circulates from a first tank connected to the hot source towards a second tank connected to the cold source under the effect of the pressure difference between the two sources and it accumulates mechanical, potential or kinetic energy. During the second phase of each cycle, the liquid returns from the second tank towards the first under the effect of the mechanical energy accumulated during the first phase.

The devices according to the invention being self-contained, they may operate at isolated sites, without any supply of mechanical or electrical energy. The heat pumps according to the invention are particularly suitable as circulation pumps for equipping water-heating installations employing solar collectors. The pumps according to the invention are self-regulating as the rate of flow of heat carrier fluid varies in the same sense as the temperature difference between the solar collector and the hot water accumulation tank.

Solar energy pick-up installations comprising a circulator according to the invention are very simple and very robust since they comprise no moving piece other than check valves and a valve which may be a very simple float valve. The circulation pumps according to the invention are easy to maintain by personnel who is not highly specialised and they may function for a very long time without supervision and without maintenance.

The invention will be more readily understood on reading the following description with reference to the accompanying drawings, in which.

Figure 1:
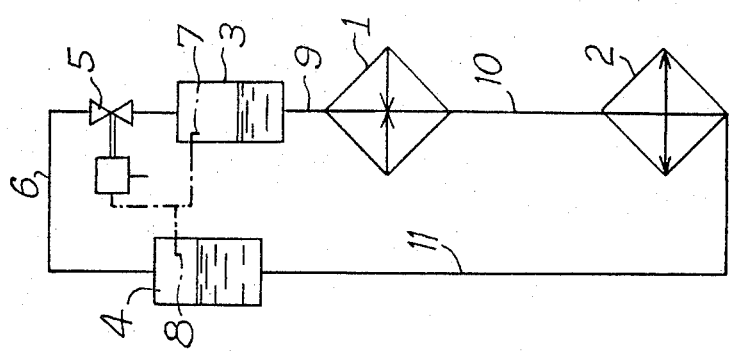
FIG. 1 is a general diagram of a heat pump according to the invention.

Referring now to the drawings, the heat pump shown in FIG. 1 comprises a hot source 1 and a cold source 2. It also comprises a first closed chamber or tank 3, located above and in the vicinity of the hot source, and a second closed chamber or tank 4 which is located at an altitude higher than or equal to that of the tank 3. These two chambers 3 and 4 contain a liquid in phase equilibrium with the vapour.

The upper parts of the two chambers 3 and 4 which contain the vapour phases communicate with each other through a pipe 6 which comprises an automatic valve 5 whose openings and closures are automatically controlled by two level sensors 7 and 8, sensing the high and low level of the liquid/vapour interface in one or the other of the two chambers 3 or 4.

A circuit constituted by portions 9, 10 and 11 connects together the lower parts of the two chambers 3 and 4, passing through the hot source 1 and the cold source 2. The tanks 3 and 4 connected together by pipes, 6,9,10,11 form a closed circuit of constant volume which contains a constant quantity of fluid which is in liquid and gaseous state.

The pump according to FIG. 1 functions as follows:

At the beginning of the cycle, the valve 5 is closed and tank 3 contains a great deal of liquid and little vapour. The liquid contained in the tank 3 communicates with the hot source. It heats up and the pressure of the vapour increases in the tank 3. As the pressure rises, the liquid contained in the chamber 3 is driven by the pressure through conduit 9 and the cold source 2. It cools on passing through the cold source and progressively fills the chamber 4.

As the liquid contained in the chamber 4 is at lower temperature, the vapour pressure in the chamber 4 is lower than in chamber 3 and as the liquid of chamber 3 heats up, the level lowers in the chamber 3 and rises in chamber 4 hence a circulation of the liquid through the hot and cold sources under the effect of the pressure difference. The heat furnished by the hot source is partly yielded to the cold source and partly converted into kinetic and potential energy of the liquid which delivered at an upper level.

When the level of the liquid reaches a lower threshold in the tank 3, or reaches an upper threshold in tank 4, a liquid level sensor located in one or the other of the two tanks controls the opening of the valve 5, this placing the upper parts of the two tanks directly in communication through the pipe 6. These two tanks then form two communicating vessels and the liquid contained in tank 4 flows, by gravity, towards the tank 3 through the pipe 11, 10, 9 until the level of the liquid/vapour interface reaches a low theshold in tank 4 or a high threshold in tank 3 which is detected by the level sensor which controls the closure of the valve 5, and a new cycle starts again.

It will be noted in FIG. 1 that the cold source may be at a level lower than that of the hot source, this constituting a characteristic difference with respect to the circuits in which a liquid circulates by thermosiphon where the hot liquid rises from the hot source towards the cold sources. Another difference is the fact that the speed of displacement of the fluids is relatively high with respect to the thermosiphon systems.

It should be noted that the liquid contained in tank 4 heats up upon opening of the valve 6 by contact with the vapour coming from tank 3; it is therefore a heated liquid which returns to the cold source via pipe 11.

The distance between the sources is nonetheless limited as the volume of each of the pipes 10 and 11 must be less than the volume of liquid displaced in order that liquid is exchanged between the sources.

Figure 2:
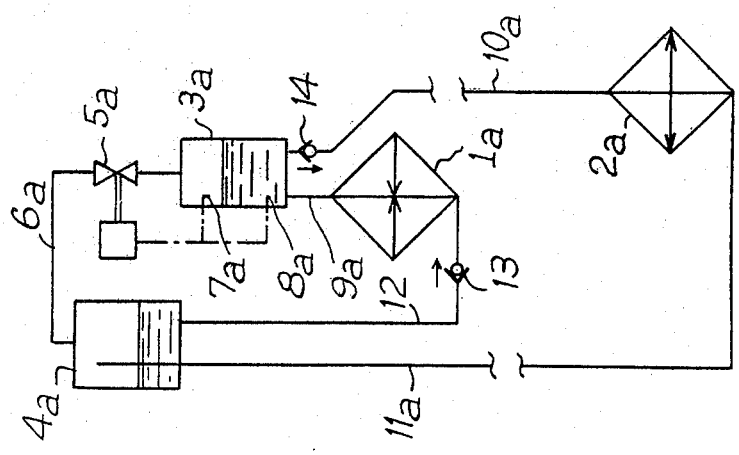
FIG. 2 is a general diagram of a variant embodiment of a heat pump according to the invention.

FIG. 2 shows another embodiment of a heat pump according to the invention which differs from the preceding one by the fact that the flow of liquid between the hot source and the cold source is unidirectional and the hot source is constantly traversed in upward direction. In the embodiment according to FIG. 2, the distance between the hot and cold sources is not limited if the heat insulation of the pipes is satisfactory.

The parts similar to those of FIG. 1 are given the same reference followed by index a. Tank 4a is located at a level higher than that of tank 3a.

The difference in altitude between the levels of the liquids in the two tanks is sufficient for the corresponding static pressure to allow the liquid to overcome the resistance of the non-return valve 13, placed in conduit 12 connecting the bottom of the upper tank to the hot source. The direction of valve 13 is such that the liquid issuing from the upper tank may flow solely in the direction of the hot source and the lower tank through pipes 12 and 9a. Conduit 10a connects the bottom of the lower tank to the cold source via the valve 14 which allows flow of the liquid only in the direction of tank 3a towards the cold source 2a. The conduit 11a connects the lower part of the cold source to the upper part of the tank 4a. Thus, the conduit assembly 10a, 11a, 12 and 9a forms a loop through which the liquid can pass only in one direction.

One of the tanks, preferably tank 3a, comprises two level sensors 7a and 8a, the second tank 4a has a volume larger than the first so as to be able to absorb the supplementary volume due to the expansion of the liquid with the temperature without the functioning of the installation being disturbed.

The machine of FIG. 2 functions as follows:

At the beginning of the cycle, the tank 3a is filled with liquid up to the height of the high level sensor 7a. Due to the communication with the hot source, the liquid heats up and the pressure increases in this tank 3a, this causing the expulsion of the hot liquid through the valve 14 and the conduit 10a towards the cold source. Thus, it is liquid having the temperature of the hottest parts of the source 1a which reaches the cold source 2a.

This liquid, after having been cooled by passage through the cold source, progresses in the conduit 11a and opens in the top part of the tank 4a where it condenses the vapour. This vapour condensation creates a suction effect which is favourable to the flow of the liquid. The valve 5a opens automatically when the level of the liquid/vapour interface has reached the threshold corresponding to the low level sensor 8a. Levelling of the vapour pressures in the two tanks, consecutive to the opening of the valve 5a, provokes the flow of the liquid from the upper tank towards the hot source and the lower tank through the conduit 12 and the non-return valve 13; when the liquid/vapour interface in tank 3a reaches the level of the sensor 7a, a new cycle commences.

Although the liquid circulates alternately from tank 3 towards tank 4 and vice versa, it always circulates in the same direction from the hot source towards the cold source and it therefore allows calories to be conveyed from the hot source to the cold source by using only the energy furnished by the temperature difference between the two sources without the circuit comprising other moving mechanical pieces than two non-return valves and an automatic valve. Contrarily to the device of FIG. 1, in a device according to FIG. 2, the volume of the tanks 3 and 4 may be much lower than that of the pipes and that of the hot and cold sources in that the circulation is unidirectional and the liquid passes through the hot source in upward direction, the liquid expelled through the valve 14 is thus at high temperature.

The distance between the two hot and cold sources may be relatively great as the pressure difference in the tanks 3 and 4 is sufficient to ensure circulation of the liquid in a circuit of long length, the only static resistances to be overcome being those of the valves and the difference in altitude between the two high and low tanks. The rate of flow in the conduit 10a connecting the hot source to the cold source is variable, it depends on the pressure drop in the conduits and the difference between the pressures in the high and low tanks, and consequently this rate of flow is associated with the temperature difference between the sources and with the nature of the fluid.

The fluid contained in the installation is chosen as a function of the temperatures of the two sources in order to have a sufficient pressure difference to ensure circulation of the fluids.

Water can be used for hot source temperatures higher than 80° C. For lower temperatures, a more volatile fluid such as alcohol may be mixed with the water. The mixture has a lower freezing point than pure water, but safety is assured in the case of leakage of the primary circuit and mixture with domestic hot water, the mixture of water and very diluted alcohol not generally being considered as toxic. The range of the chlorofluorine compounds of carbon cover the domain of average and low temperatures. For a solar system for heating domestic hot water, trichlorotrifluoroethane of formula $CFCl_2-CF_2Cl$, pure or diluted in white spirit, may for example be used.

Figure 3:
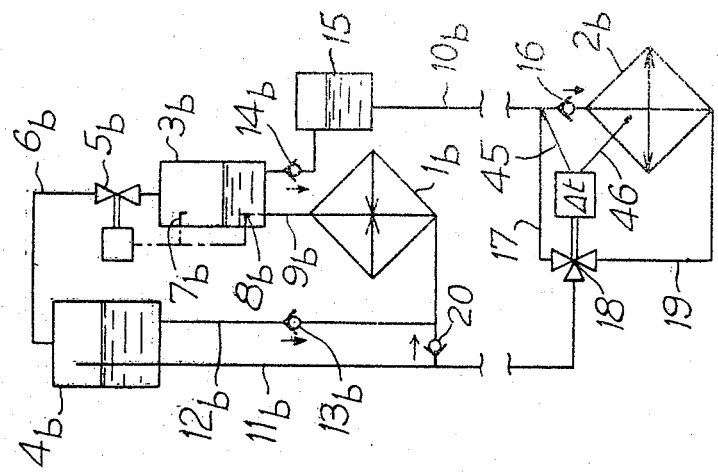
FIG. 3 is a general diagram of another embodiment of a heat pump according to the invention.

FIG. 3 schematically shows a system of heat exchange between two sources having two improvements with respect to that of FIG. 2: the flow of the liquid is uninterrupted in the conduits of the cold source as long as the latter is at a temperature lower than the temperature of the hot source. The cold source is isolated when the hot source cools and becomes colder than the cold source. The advantage of the continuous flow is to allow a better heat exchange at the level of the cold source.

In FIG. 3, the elements similar to those of FIG. 2 are given the same reference followed by index b.

This FIG. 3 comprises a third closed tank 15, located below tank 3b. A conduit bearing valve 14b connects the top part of the tank 15 to the bottom of tank 3b. The bottom of the tank 15 is connected to the top part of the cold source by conduit 10b through the non-return valve 16. A conduit 17 communicates with the conduit 10b and with one way of a three-way valve 18 of which the other two ways are connected, one to conduit 11b, the other to conduit 19, issuing from the lower part of the cold source. This valve 18 has two stable states; it connects the conduit 17 to conduit 11b or conduit 19 to conduit 11b. The change in state of the three-way valve is controlled by the difference between the temperature of the cold source and the temperature of the liquid in conduit 10b.

The valve 20 connects conduit 11b to the lower part of the hot source.

The lower tank 3b comprises the two level sensors 7b and 8b, the upper tank 4b has a larger volume than combined tanks 3b and 15. It also enables the surplus liquid due to the expansion of the liquid to be contained.

The device allowing a continuous flow is constituted by elements 15 and 20. The device allowing a regulation of the heat supplies to the cold source is constituted by elements 16, 17 and 18. These two devices play independent roles.

The device regulating the heat supplies to the cold source functions as follows: two temperature probes 45, 46 compare the temperature of the liquid coming from the hot source through conduit 10b with the temperature of the cold source. If the temperature of the cold source is the lower of the two, the three-way valve 18 connects conduits 19 and 11b and the liquid flows through valve 16 through the cold source. If the temperature of the cold source is higher than that of the liquid contained in conduit 10b, the three-way valve connects conduit 17 with conduit 11b. The liquid thus circulates directly from conduit 10b to conduit 11b, avoiding the cold source. The lower part of the cold source is isolated by the three-way valve 18, the top part of the cold source is isolated by the valve 16, so that the cold source is totally isolated from the rest of the circuit and can therefore not yield heat to the rest of the installation.

When the hot source is at higher temperature than the cold source, the valve 18 and valve 16 do not substantially modify the circuit of the liquid in the cold source; this circuit becomes comparable to that of FIG. 2.

The continuity of flow is ensured by tank 15 which contains liquid and vapour at high temperature coming from the hot source.

At the beginning of the cycle, the tank 3b is filled with liquid up to the level of the high level sensor 7b, valve 5b is closed, the rise in temperature, due to the heat coming from the hot source, provokes an increase in pressure. When the pressure in the tank 3b becomes higher than the pressure in tank 15, the valve 14b opens and tank 15 fills with liquid which then flows through conduit 10b and the cold source to rise in the upper tank through conduit 11b. When the level in the tank 3b reaches the lower threshold corresponding to the level sensor 8b, the automatic valve 5b opens and the pressure in the tank 3b drops, this provoking closure of the non-return valve 14b. The pressure in the tank 15 is then the highest in the installation. The liquid contained in the conduits 10b, 19, 11b has acquired kinetic energy at the moment of opening of the valve 5b, it continues its movement which is facilitated by the excess pressure inside the accumulator tank 15. When the valve 5b is open, the pressure is the same on both sides of the valve 20, and the liquid may flow directly from conduit 11b to the hot source passing through the non-return valve 20. The liquid may thus rapidly fill the tank 3b coming from conduit 12b and conduit 11b. When the level of the liquid in the tank 3b reaches the high level 7b, the valve 5b closes. The increase in pressure due to the rise in temperature is initially reinforced by the pressure due to the kinetic energy of the liquid arriving via valve 20. The valve 14b therefore opens more rapidly than during the first cycle. If the pressure in the hot source and in the tank 3b is sufficient to maintain valves 13 and 20 closed, the liquid may continue to flow due to its kinetic energy in the tank 4b until valve 5b opens.

The rate of flow of the liquid through the cold source is therefore variable but always in the same direction. The role of tank 15b may be accomplished by the part of the pipe located at the outlet of the valve 14b, if this pipe has a sufficient volume in the vicinity of the tank 3b.

The flow in the hot source is pulsed but heat exchange between the hot source and the tank 3b is permanent. When the valve 5b and valves 13b and 20 are all closed, the hot source yields heat by vaporization of the liquid which rises in conduit 9b to heat the contents of tank 3b, this provoking a very efficient heat exchange although the liquid is overall immobile in the hot source.

Figure 4:
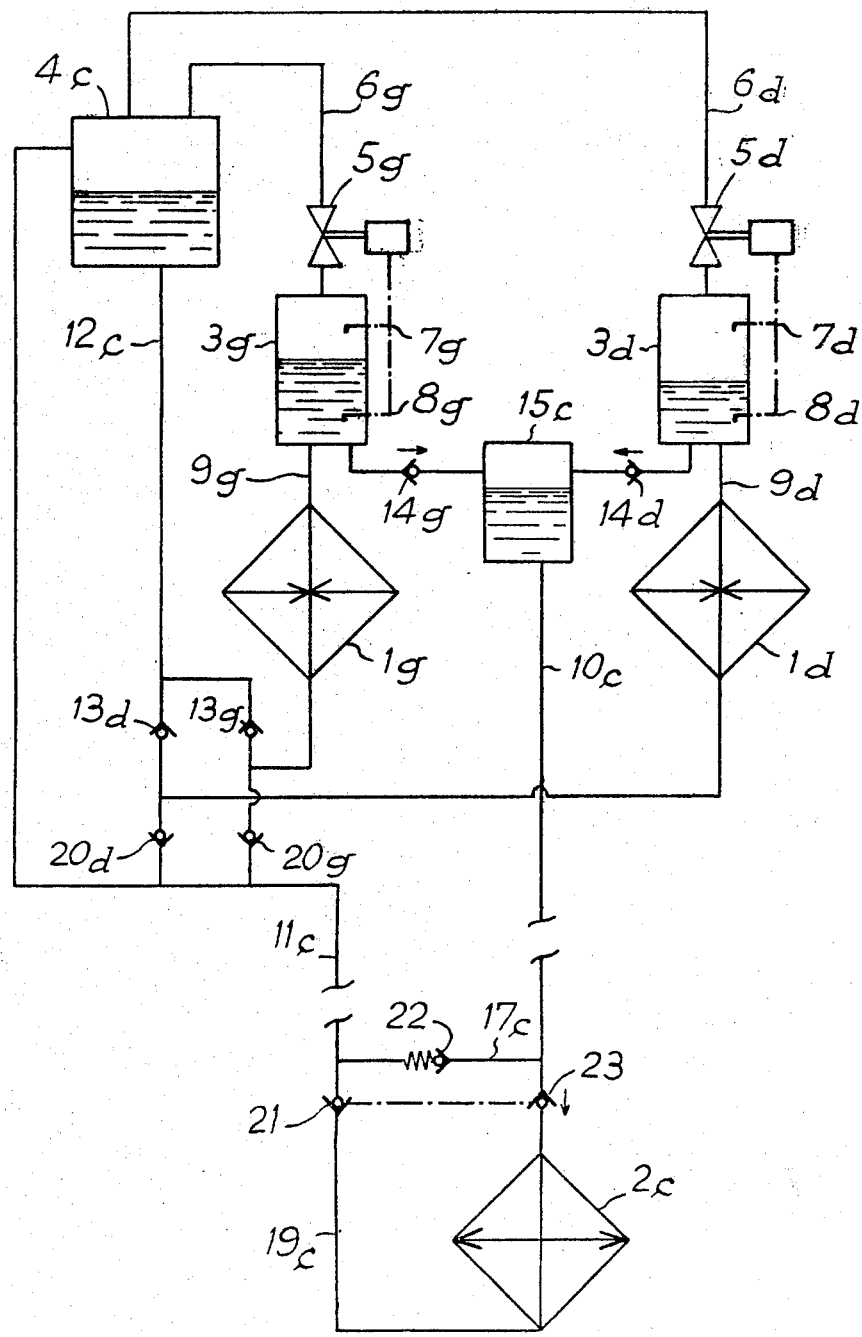
FIG. 4 is a general diagram of a device according to the invention comprising two hot sources in parallel.

FIG. 4 schematically shows an installation comprising two different hot sources functioning in parallel with a single cold source and a common pipe, with two conduits, connecting the hot sources to the cold source. The hot sources have the possibility of furnishing calories at different moments and at different rhythms. These sources may for example be two groups of solar furnaces of different surfaces or orientations.

The lower part of FIG. 4 shows a simplified device making it possible to avoid at the cold source the losses of heat when the hot source is no longer at a sufficient temperature. This device functions independently and may therefore be used in the installations described in the preceding Figures. It does not have to be taken into account to interpret the functioning of the devices of the top part of FIG. 4.

The similar elements associated with each of the two hot sources are shown with the same reference followed by index d or g respectively depending on whether it is the first or second hot source. The common elements are shown by a reference followed by letter c, when they have already been shown in the preceding Figures.

Each of the hot sources 1g or 1d is associated with a lower tank 3g or 3d comprising an automatic valve 5g or 5d, controlled by the level of the liquid in each lower tank. Each of the tanks is connected by a valve 14g or 14d to the accumulator tank 15c.

Each tank 3g or 3d is placed in communication with the accumulator tank 15c only when its pressure becomes greater than that of said accumulator tank. The liquid issuing from this tank passes through the hot source and reaches, via conduit 11c, the upper part of the upper tank 4c where it condenses the vapour. When one of the valves 5g or 5d is open, valves 13d, 20d or 13g, 20g allow the liquid to penetrate in the hot source corresponding to the valve which is open.

The presence of a plurality of sources in parallel associated with tanks each comprising an automatic valve ensures a continuous and regular flow of the liquid in the conduits connecting the hot sources to the cold source. If one of the hot sources, for example 1g, is at low temperature, valve 14g remains closed; under the effect of the depression due to this temperature, the tank 3g fills with liquid, the valve 5g is therefore closed; valves 13g and 20g close when tank 3g is filled. Thus, the source 1g and the tank 3g are totally isolated from the rest of the circuit as long as the pressure in the tank 3g does not attain the pressure of the accumulator tank 15c.

It has just been seen that when a hot source is at a temperature lower than that of the liquid in the accumulator tank 15c, this hot source was isolated, this reducing the possible losses of the cold source, but it is nevertheless advantageous to be able to isolate this cold source when the temperature therein becomes higher than that of the liquid issuing from the accumulator tank. To this end, a wide face valve 23 is placed immediately above the cold source. This valve controls a valve or a check valve 21 of smaller face, so that valve 21 opens and closes at the same time as valve 23. When the cold source is at a higher temperature than the accumulator tank, the pressure in the cold source is higher, this provoking closure of valve 23 and consequently valve 21 is closed likewise. The cold source is thus isolated from the rest of the circuit. A calibrated valve 22 then enables the liquid issuing from the accumulator tank to join the upper tank via conduits 17c and 11c. This circulation allows the liquid in pipes to rise in temperature at the beginning of functioning of the installation. The valve 22 is calibrated so that it does not allow the liquid to pass when the valves 23 and 21 are open.

Figure 5:
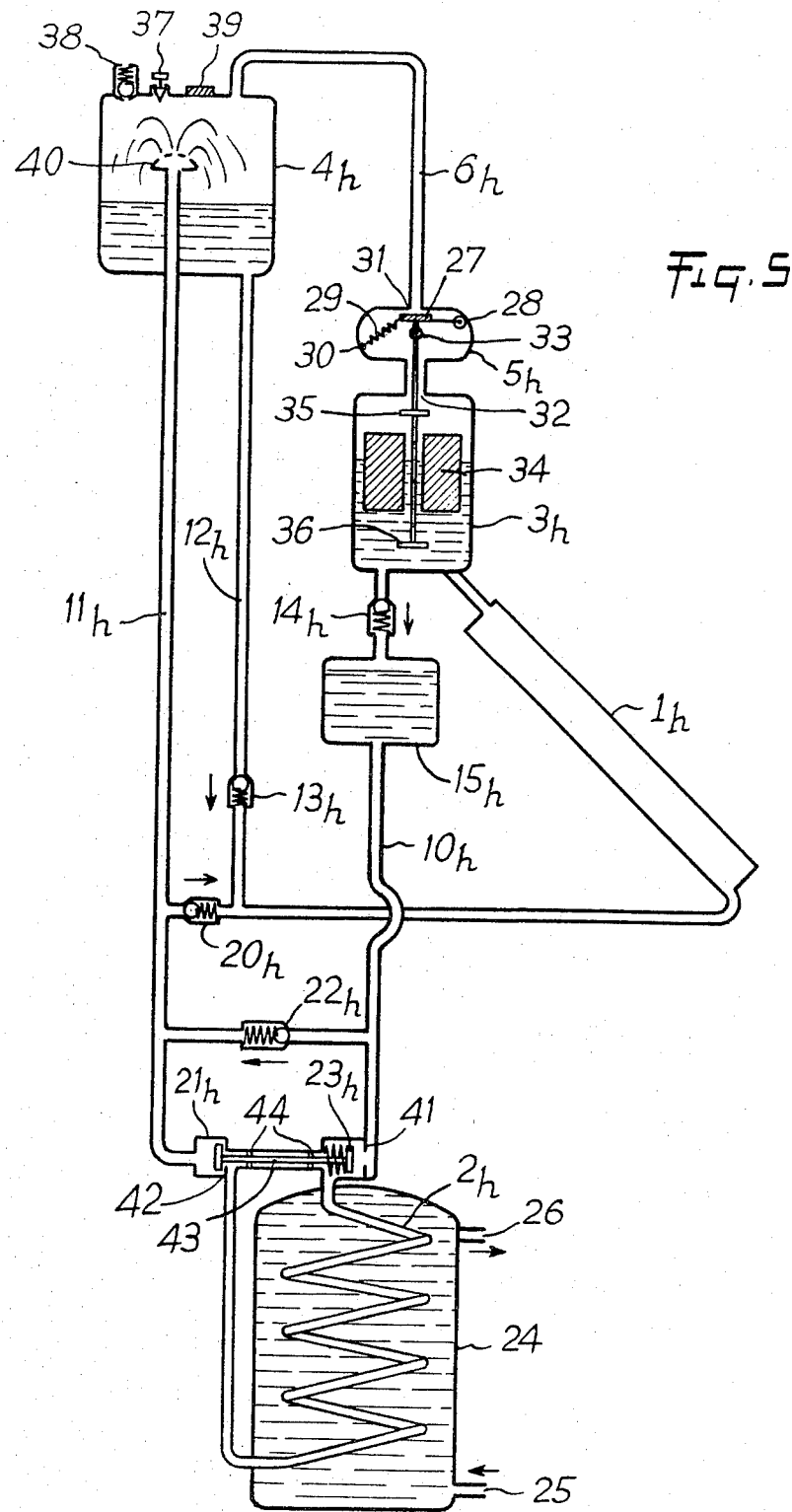
FIG. 5 is a diagram of an application of a pump according to the invention as pump for circulation of a heat carrier fluid in an installation comprising a solar collector and a hot water tank.

FIG. 5 schematically shows an application of a heat pump according to the invention.

The elements similar to those of the preceding Figures are shown by the same reference followed by letter h.

In the application considered in this Figure, the transfer of heat is ensured between a solar collector 1h, acting as hot source, and an exchanger tube 2h acting as cold source, said exchanger tube being immersed in the water contained in a reservoir 24 which is for example a reservoir for preparing domestic hot water.

The rest of the installation is not peculiar to this application and may be used in the majority of the remote heat transfer systems.

A heat carrier fluid in equilibrium with its vapour fills the primary circuit of the installation.

The reservoir 24 comprises a cold water inlet 25 at the base and a heated water outlet 26 in its upper part.

The relative dimensions of the different elements of FIG. 5 have not been respected; in particular, the automatic valve 5h has been enlarged to enable its components to be shown. This valve comprises a check valve 27, pivoted about a pivot pin 28, a spring 29 is fixed to the valve and to an anchoring point 30 so that this spring is slightly compressed. The positions of the anchoring points of the spring are such that the check valve has two stable states in its rotation about axis 28. In one of these states, the check valve obturates the seat 31 located in the upper part; in the other stable state, the check valve is open.

The valve 27 is connected to a rod 32 by a pivot pin 33, parallel to pin 28, so that the rising and descending movements of the rod provoke the opening and closure of the valve respectively. The rod 32 is provided with two stops 35 and 36.

The tank 3h contains an annular float 34 adapted to slide freely about the rod 43 between the two stops 35 and 36.

Functioning is as follows: When the level of the liquid rises in the tank 3h, the float 34 abuts against the stop 35, the buoyancy on the float provoking the rise of the valve 27 which is applied on the seat 31. After the closure of the valve, the thrust exerted by the spring 30 maintains the valve closed, the rise in pressure in the tank 3h being favourable to this closure.

The level of the liquid in the tank 3h decreases progressively as the liquid is transferred towards the tank 4h through the accumulation tank 15h and the coil 2h. When the float 34 reaches the stop 36, it abuts thereon and as the liquid continues to descend, the apparent weight of the float 34 increases and finally drives the rod 32 and the valve 27 downwardly. At that moment, the vapour pressures in the two tanks 3h and 4h become level and the liquid of the tank 4h flows by gravity towards the tank 3h through the valve 13h, the liquid coming from the accumulator tank 15h and from the cold source penetrates in the hot source via valve 20h; these flows continue until the valve 27 closes. The closure of the valve 20h obliges the liquid, coming from the cold source, to rise again in the upper part of the tank 4h. A sprinkling device 40, constituted by a perforated conduit, allows this liquid to condensate the vapour rapidly, thus provoking a suction effect and the new cycle continues.

The spring 29 enables the valve to have two stable states; in particular, upon opening, the valve is not closed by the sudden passage of the vapour from tank 3h to tank 4h.

The tank 4h is provided with a manual blow-off cock 37, a safety valve 38 and a filler cap 39.

Should the installation have a micro-leak, air may penetrate in the circuits when the installation is in depression by the drop in temperature of the hot source. When the hot source rises in temperature, the pressure increases in the whole of the circuit and the air contained in the circuit may escape through the valve 38, when the pressure is sufficient; the escape of this air then allows the installation to function normally.

The device for protection against losses of the source is constituted by two valves 23h and 21h rendered fast in their movements of translation by a rod 43 sliding in a tube of narrow cross section comprising seals 44.

The seat 41 of the valve 23h has a larger section than the seat 42 of the valve 21h, so that the assembly of the two valves is maintained closed when the fluid contained in the coil 2h has a pressure greater than the fluid of the rest of the installation. The valve 41 comprises a spring which tends to close it in the absence of stress from the fluids. The calibrated valve 22h allows a shunt of the liquid when the assembly constituted by the valves 23h and 21h is closed.

The installation may comprise one or more circulation indicators constituted for example by helices driven by the movement of the liquid (elements not shown in the Figure).

What is claimed is:

1. Process for causing a heat carrier fluid to circulate in a closed circuit, of constant volume, comprising a hot source, a cold source, a first closed tank located at a level higher than that of the hot source, of which the lower part communicates with the upper part of the hot source and a second closed tank which is located at a level at least equal to that of said first tank, which tanks contain a mixture of the liquid and vapour phases of said fluid, the upper parts of said tanks being connected together via a pipe provided with a valve and the lower part of the first tank being connected to the second tank by a circuit passing through said cold source, said process comprising the following steps:

when the level of the liquid in the first tank reaches a high level, said valve is closed, the liquid of the first tank is heated by the hot source, the pressure increases in the first tank and the hot liquid is driven towards the second tank through the cold source and mechanical energy is accumulated;

when the level of the liquid in the first tank reaches a low level, said valve is opened, the pressures in the two tanks become level and the liquid flows from the second tank towards the first under the effect of the accumulated mechanical energy, and when the level of the liquid in the first tank reaches a high level again, a new cycle recommences and, in the course of these cycles, the heat carrier fluid circulates, conveying calories from the hot source towards the cold source without furnishing energy to the outside, so that the process may ensure a heat exchange between two sources, even remote ones, having a small temperature difference therebetween.

2. Device for causing a heat carrier fluid to circulate in a closed circuit, of constant volume, comprising at least one hot source and at least one cold source, said device comprising:

a first closed tank which is located at a level higher than that of the hot source and of which the lower part communicates with the upper part of the hot source, a second tank which is located at a level at least equal to that of the first tank, which tanks contain a mixture of the liquid and vapour phases of said fluid, a pipe which connects the upper parts of said tanks containing the vapour phase and which is equipped with an automatic valve, two level sensors sensing the high and low level of the liquid/vapour interface in one of the two tanks, and a circuit which connects the lower part of the first tank to the second tank through said cold source.

3. The device of claim 2, comprising a circuit which connects the lower part of the first tank to the upper part of the hot source and the lower part of the hot source to the lower part of the second tank through the cold source so that the liquid phase circulates in said circuit from the first tank towards the second when said valve is closed and it flows by gravity in said circuit from the second tank towards the first when said valve is open.

4. The device of claim 2, wherein the second tank is located at a level higher than that of the first tank, the lower part of the first tank is connected to the second tank by a circuit comprising a first non-return valve and said cold source, the bottom of the second tank is connected to the lower part of the hot source by a pipe equipped with a second non-return valve and the upper part of the hot source is connected to the bottom of the first tank by a pipe so that, when said valve is closed, the liquid of the first tank, which is heated by the hot source, flows towards the second tank through the cold source and when said valve is open, the liquid of the second tank flows by gravity towards the first tank through the hot source.

5. The device of claim 4, wherein the circuit which connects the lower part of the first tank to the cold source and to the second tank comprises a third accumulation tank which is interposed between said first non-return valve and the cold source.

6. The device of claim 2, wherein said automatic valve is a float valve which comprises an annular float which floats in the liquid of one of the two tanks; a mobile equipment which is composed of a vertical rod which passes through said annular float and which is provided with two stops placed on either side of said float; a check valve which cooperates with a seat, which valve is articulated about a pin and at the upper end of said rod and a spring which is fixed to said valve and to an anchoring point of which the position is such that said valve has two states of stable equilibrium, one applied against said seat and the other open.

7. The device of claim 5, wherein said circuit connecting the third tank to the cold source comprises a three-way valve interposed in said circuit and a shunt which ends at the third way and which short-circuits the cold source and the device comprises a differential temperature sensor which compares the temperature of the cold source with the temperature of the liquid arriving at the cold source and which automatically places said three-way valve in the position which short circuits said cold source when the temperature of the cold source is higher than the temperature of the liquid arriving at the cold source.

8. The device of claim 5, comprising two hot sources and two lower tanks which are connected in parallel, through check valves on the same third accumulation tank, an upper tank of which the upper part is connected respectively to the upper parts of the two lower tanks via conduits each equipped with an automatic valve which is controlled by two high and low level sensors located in the corresponding lower tank and the bottom of the third tank is connected to the upper tank by a circuit which passes through the cold source.

9. The device of claim 5, wherein said cold source is interposed between a first upstream valve and a second downstream valve having a smaller surface, which valves are servo-controlled so that they open and close simultaneously and said circuit passing through said upstream valve, the cold source and said downstream valve comprises a short circuit which is equipped with a third calibrated valve.

10. The device of claim 2 for causing a heat carrier fluid to circulate in a closed circuit of constant volume, comprising a solar collector and an exchange tube, which circuit comprises a pump for circulation of the heat carrier fluid which comprises:

a first closed tank which is located at a level higher than that of said solar collector and of which the lower part communicates with the upper part of said solar collector, a second closed tank which is located at a level higher than that of the first tank, which tanks contain a mixture of the liquid and vapour phases of said heat carrier fluid, a pipe which connects together the upper parts of said tanks and which comprises a seat at the end which opens in said first tank, an automatic float valve which is located in the first tank and which cooperates with said seat, a circuit which connects the lower part of the first tank to a first end of said exchanger tube through a first check valve and which connects the second end of said exchanger tube to the second tank, and the lower part of the second tank is connected to the lower part of said solar collector by a pipe comprising a second non-return valve.

11. The device of claim 10, wherein said circuit, which connects the lower end of the first tank to said exchanger tube comprises a third tank which is interposed between said first valve and said exchanger tube and the circuit which connects the exchanger tube to the second tank comprises a shunt, equipped with a third valve which connects said circuit to the lower part of said solar collector.

* * * * *